United States Patent [19]

Nakada

[11] 4,416,344
[45] Nov. 22, 1983

[54] OUTRIGGERED VEHICLE CAPABLE OF CRABWISE TRANSLATION

[75] Inventor: Minoru Nakada, Komatsu, Japan

[73] Assignee: Kabushiki Kaisha Komatsu Seisakusho, Tokyo, Japan

[21] Appl. No.: 275,297

[22] Filed: Jun. 19, 1981

[51] Int. Cl.³ .............................................. B62D 57/02
[52] U.S. Cl. .................................... 180/8 R; 180/199; 180/203; 280/755
[58] Field of Search ...................... 180/8 R, 8 BA, 8 C, 180/8 D, 8 E, 199, 200, 202, 203, 21; 280/12.11, 1.17, 218, 219; 305/1

[56] References Cited

U.S. PATENT DOCUMENTS 2,452,632 11/1948 Cameron ............................ 180/8 D
3,150,733 9/1964 Goebel ................................ 180/8 R
3,921,739 11/1975 Rich et al. .......................... 180/8 C

FOREIGN PATENT DOCUMENTS 67246 6/1957 France ................................ 180/8 E
43-882 1/1968 Japan .
630200 9/1978 U.S.S.R. ............................ 180/8 C Primary Examiner—Joseph F. Peters, Jr.
Assistant Examiner—Mitchell J. Hill
Attorney, Agent, or Firm—Armstrong, Nikaido, Marmelstein & Kubovcik

[57] ABSTRACT

A rubber-tired, outriggered vehicle for use as the mounting of a mobile crane is disclosed which has two pairs of telescopic outrigger beams on the opposite sides of the vehicle body, together with a lift cylinder coacting with each outrigger beam for raising and lowering the vehicle body, and an extend cylinder for extending and contracting each outrigger beam. The invention features a hydraulic circuit having two separate valves for independently actuating the two pairs of extend cylinders, in addition to another valve for the actuation of the lift cylinders, so that the vehicle can be crabbed by operating the three valves in a prescribed manner.

4 Claims, 4 Drawing Figures

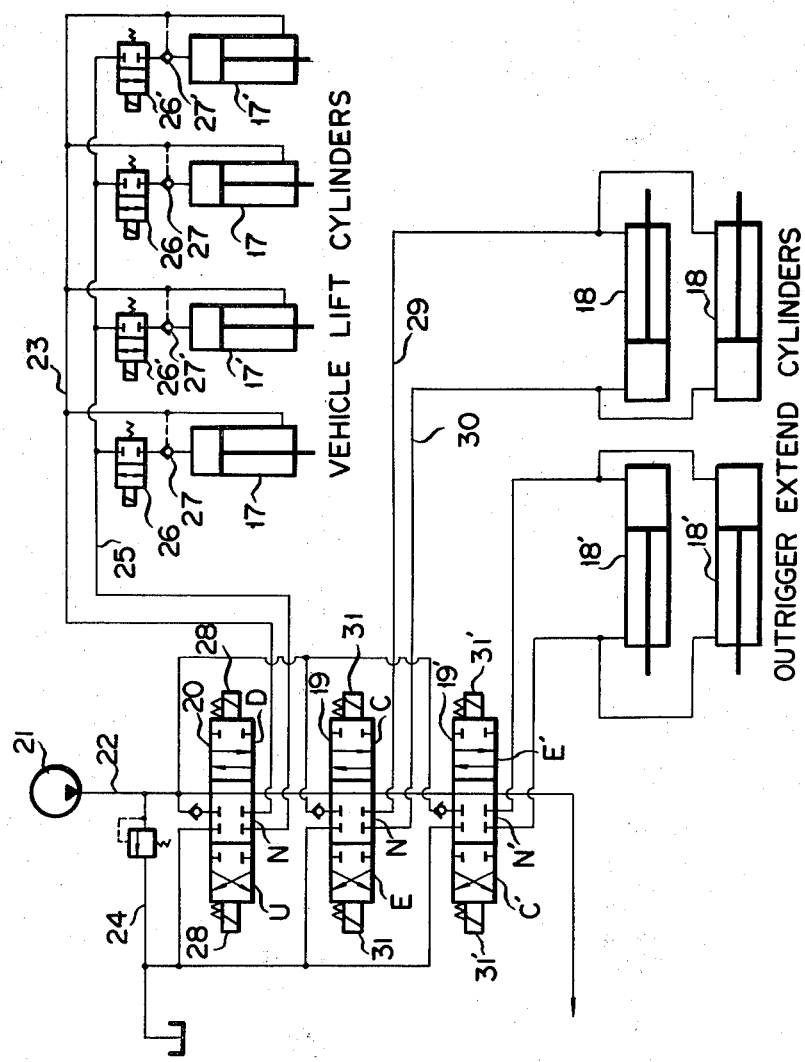

OUTRIGGERED VEHICLE CAPABLE OF CRABWISE TRANSLATION

BACKGROUND OF THE INVENTION

This invention relates to an outriggered vehicle, such as a rubber-tired carrier or truck for use as the mounting of a mobile crane, which is capable of crabbing, that is, moving in directions at right angles with the normal travelling direction of the vehicle. The invention also pertains to a fluid circuit for adapting known vehicle outrigger systems for such sideways translation of the vehicle.

In the use of a mobile crane or other construction or industrial vehicles, it often becomes necessary to shift the vehicle sideways into a narrowly confined space on either side of the road. Since such a vehicle is usually not constructed for direct crabwise motion, it must be maneuvered back and forth, in a zigzag fashion, into the limited space, if the space has a sufficient length, in a direction parallel to the road, to permit such zigzag movement of the vehicle. If not, then the vehicle cannot possibly be neatly located in the space.

Self-propelled rubber-tired carriers or trucks for use as mobile crane mountings are usually furnished with extensible outriggers, with or without hydraulic power actuation. As heretofore constructed, all the hydraulically actuated outriggers of such a vehicle have been under the control of a single valve, for simultaneous extension or construction only, so that they have so far served the sole purpose of improving over-the-side stability.

SUMMARY OF THE INVENTION

The present invention seeks to make possible the direct sideways translation of an outriggered vehicle, by use of its outrigger system, and hence to improve the maneuverability of such a vehicle. In attaining this objective, moreover, the invention seeks to make as much use as possible of the existing parts of conventional outriggered vehicles of the type under consideration, thus providing for ready adaptation of such vehicles for direct crabbing.

Stated in its perhaps broadest aspect, the invention provides a vehicle having two pairs of extensible outrigger beams connected to a vehicle body for extension toward its opposite sides. The vehicle further comprises means for moving the body up and down, with respect to the ground, in coaction with the outrigger beams, means for simultaneously extending and contracting one pair of outrigger beams, and means for simultaneously extending and contracting the other pair of outrigger beams. Thus, since the two pairs of outrigger beams can be individually extended and contracted, the outrigger system can be used for the crabbing of the vehicle by operating the noted three means in a manner set forth herein.

Preferably, as in the embodiments of the invention disclosed herein, each outrigger beam is provided with a lift cylinder for raising and lowering the vehicle body in coaction, and with an extend cylinder for its own extension and contraction. A fluid circuit of the vehicle comprises three control valves for independently controlling all the set of lift cylinders, one pair of extend cylinders, for the extension and contraction of one pair of outrigger beams, and the other pair of extend cylinders. The actuation of the three control valves in the prescribed manner enables the vehicle to shift crabwise with the outrigger system. It will be seen that conventional outriggered vehicles of this class can be adapted for crabwise translation by mere alteration of the valving associated with the outrigger extend cylinders.

The above and other features and advantages of this invention and the manner of attaining them will become more apparent, and the invention itself will best be understood, from a study of the following description of the preferred embodiments together with the attached drawings.

BRIEF DESCRIPTION OF THE DRAWINGS

FIG. 2 is a schematic diagram of an example of hydraulic circuit providing for the lateral translation of the vehicle of FIG. 1 in accordance with the invention;

DESCRIPTION OF THE PREFERRED EMBODIMENTS

Figure 1:
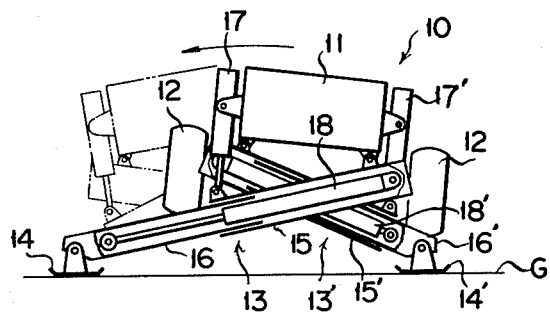
FIG. 1 is an end elevational view, with parts broken away to reveal other parts, of an example of outriggered vehicle capable of direct lateral translation according to the invention, the vehicle being shown in the act of such lateral translation.

FIG. 1 illustrates the general organization of the outriggered vehicle, generally designated 10, suitable for use as mobile crane mounting. The vehicle 10 comprises a body 11 having ground engaging means, which in this embodiment take the form of two pairs of rubber-tired wheels 12 (only one pair being seen), for longitudinal translation. The outrigger system of this vehicle comprises four telescopic beams 13 and 13' (two seen) each connected at one end to one side of the vehicle body 11 for pivotal motion about an axis in the longitudinal travelling direction of the vehicle, and each extending toward the opposite side to terminate in a float 14, 14'. For convenience of description the two outrigger beams 13 or 13' connected to each side of the vehicle body are herein considered to make up a pair. Thus each pair of outrigger beams are spaced longitudinally of the vehicle, and FIG. 1 reveals only one outrigger beam of each pair.

Each outrigger beam 13, 13' comprises an outrigger box 15, 15' pivotally coupled at one end to the vehicle body 11, and a slide box 16, 16' telescopically fitted in the outrigger box and having the float 14, 14' pivotally coupled to its distal end. A double-acting hydraulic cylinder 17, 17' extends between and is pivotally coupled to the vehicle body 11 and the other end of each outrigger box 15, 15'. These cylinders 17 and 17' coact with the outrigger beams 13 and 13' to raise and lower the vehicle body 11, as well as the wheels 12, with respect to the ground G, so that they are herein termed the lift cylinders. Another double-acting hydraulic cylinder 18, 18' is mounted within each outrigger beam 13, 13' and has its opposite ends connected to its two telescoping boxes 15, 15' and 16, 16' for extending and contracting the outrigger beam. The two pairs of cylinders 18 and 18' are therefore herein called the extend cylinders.

The configuration of the outriggered vehicle 10 as so far described is conventional, and therein lies no intrinsic feature of this invention. The invention features the hydraulic circuit of FIG. 2 having two extend control valves 19 and 19' for individually causing extension and contraction of the two pairs of extend cylinders 18 and 18', in addition to a lift control valve 20 for the extension and contraction of the set of four lift cylinders 17 and 17'. The three control valves 19, 19' and 20 conjointly enable the outrigger system to move the vehicle in either of the opposite lateral directions. As has been stated, only one extend control valve has heretofore been provided for the simultaneous extension and contraction of the two pairs of extend cylinders.

The hydraulic circuit of FIG. 2 includes an engine-driven pump 21 for the delivery of hydraulic fluid under pressure to the opposite fluid chambers of the lift cylinders 17 and 17' and extend cylinders 18 and 18' via the lift control valve 20 and extend control valves 19 and 19'. Although the three control valves 19, 19' and 20 are each shown to have six ports, it will be seen that each valve can be thought of as having only four ports for the purposes of this invention. Thus the three control valves are in parallel connection.

Connected between the pump 21 and the set of lift cylinders 17 and 17', the lift control valve 20 is a three-position closed-center one. The three positions of this lift control valve are as follows:

1. A center position N where all the four pertinent ports are closed.
2. A DOWN position D where a pump pressure conduit 22 communicates with a conduit 23 connected to the rod end chambers of all the lift cylinders 17 and 17', and where a drain conduit 24 communicates with a conduit 25 connected to the head end chambers of all the lift cylinders via respective on-off valves 26 and 26' and check valves 27 and 27'.
3. An UP position U where the pump pressure conduit 22 communicates with the conduit 25 and where the drain conduit 24 communicates with the conduit 23.

Preferably the lift control valve 20 is solenoid actuated, having a pair of solenoids 28 at its opposite ends. The selective energization of these solenoids causes the shifting of the valve to either of its offset DOWN and UP positions. The on-off valves 26 and 26' are also solenoid actuated, individually, to shift from their normal closed positions to open positions. Connected between these on-off valves and the lift cylinders 17 and 17', the check valves 27 and 27' serve the purpose of blocking reverse flow from the head end chambers of the lift cylinders under the load thereon. The check valves are pilot operated from the conduits connected to the rod end chambers of the respective lift cylinders 17 and 17', permitting the drainage of the fluid from the head end chambers upon delivery of the pressurized fluid to the rod end chambers.

Thus, upon shifting of the lift control valve 20 to the DOWN position D, the pump 21 delivers the pressurized fluid to the rod end chambers of the lift cylinders 17 and 17'. The result is the contraction of these lift cylinders and, therefore, the lowering of the vehicle body 11 together with the wheels 12. The shifting of the lift control valve 20 to the UP position U, on the other hand, causes the delivery of the pump pressure to the head end chambers of the lift cylinders 17 and 17', provided that the on-off valves 26 and 26' are open. Thereupon the lift cylinders extend, causing the downward pivotal motion of the outrigger beams 13 and 13' and, consequently, the lifting of the vehicle body 11 off the ground G.

The first extend control valve 19 associated with the first pair of extend cylinders 18 is also of the three-position closed-center design. The three positions of this extend control valve are:

1. A center position N where all the four pertinent ports are closed.
2. A CONTRACT position C where the pump pressure conduit 22 communicates with the rod end chambers of the first pair of extend cylinders 18 via a conduit 29, and where their head end chambers communicate with the drain conduit 24 via a conduit 30.
3. An EXTEND position E where the pump pressure conduit 22 communicates with the head end chambers of the first pair of extend cylinders 18 via the conduit 30, and where their rod end chambers communicate with the drain conduit 24 via the conduit 29.

The first extend control valve 19 has a pair of actuating solenoids 31 at its opposite ends, thereby to be shifted to either of its offset CONTRACT and EXTEND positions. When shifted to the CONTRACT position, the valve 19 causes the contraction of the first pair of extend cylinders 18 and, therefore, of the corresponding first pair of outrigger beams 13. When shifted to the EXTEND position, on the other hand, the valve 19 causes the extension of the first pair of extend cylinders 18 and hence of the first pair of outrigger beams 13.

Associated with the second pair of extend cylinders 18', the second extend control valve 19' is essentially similar in construction and operation to the first extend control valve 19. The second extend control valve 19' has three operating positions N', E' and C' corresponding respectively to the positions N, E and C of the first extend control valve 19. A pair of actuating solenoids 31' at the opposite ends of the valve 19' selectively shifts the same to the two offset positions E' and C' from the neutral position N', placing the pump 21 in communication with the head end and rod end chambers of the second pair of extend cylinders 18'. Thus the second pair of outrigger beams 13' extend upon displacement of the second extend control valve 19' to the EXTEND position E', and contract upon its displacement to the CONTRACT position C'.

Such being the construction of the outriggered vehicle according to this invention, the following, then, is the discussion of its operation, when the vehicle is to be crabbed to the left, as viewed in FIG. 1. Let it first be assumed that the three control valves 19, 19' and 20 are all in neutral, that the four lift cylinders 17 and 17' are all contracted, permitting the wheeled body 11 to rest on the ground G, and that the two pairs of extend cylinders 18 and 18' are also all contracted, with the consequent contraction of the outrigger beams 13 and 13'.

If then the operator shifts the first extend control valve 19 to the EXTEND position E through energization of one of the solenoids 31, the pump 21 will deliver the pressurized fluid to the head end chambers of the first pair of extend cylinders 18 thereby causing leftward extension of the first pair of outrigger beams 13. The operator proceeds to shift the lift control valve 20 to the UP position U, and to shift all the on-off valves 26 and 26' to the ON position, through energization of the pertinent solenoids. Thereupon the pump 21 will deliver the pressurized fluid to the head end chambers of all the set of lift cylinders 17 and 17'. Thus extended, the lift cylinders will cause the downward pivotal motion of all the outrigger beams 13 and 13' relative to the vehicle body 11 and so will raise the latter off the ground G. The solid lines of FIG. 1 depict the vehicle at this phase of crabwise translation.

The next step is the shifting of the first extend control valve 19 to the CONTRACT position C, and of the second extend control valve 19' to the EXTEND position E'. These valves 19 and 19' will then direct the pressurized fluid from the pump 21 to the rod end chambers of the first pair of extend cylinders 18 and to the head end chambers of the second pair of extend cylinders 18', respectively. With the consequent contraction of the first pair of outrigger beams 13, and extension of the second pair 13', the vehicle body 11 will move leftward, crabwise, to the phantom position of FIG. 1, while being raised off the ground. Then the lift control valve 20 may be shifted to the DOWN position D to place the pump 21 in communication with the rod end chambers of all the lift cylinders 17 and 17'. The lift cylinders will contract in a controlled manner, until the wheels 12 of the vehicle come to rest on the ground.

One cycle of lateral translation of the vehicle is now completed. The same cycle may be repeated to an extent necessary to bring the vehicle to a desired location. It is self-evident that the vehicle can be crabbed in the opposite direction through an analogous procedure.

Should the ground be uneven, the vehicle body will experience torsional stresses during such crabwise translation. One solution to this problem is to divide the body into front and rear parts and to connect them with a swivel union. Alternatively the lift cylinders may be controlled so as to take up the ground undulations, in a manner tht will readily occur to the specialists.

Second Form

Figure 3:
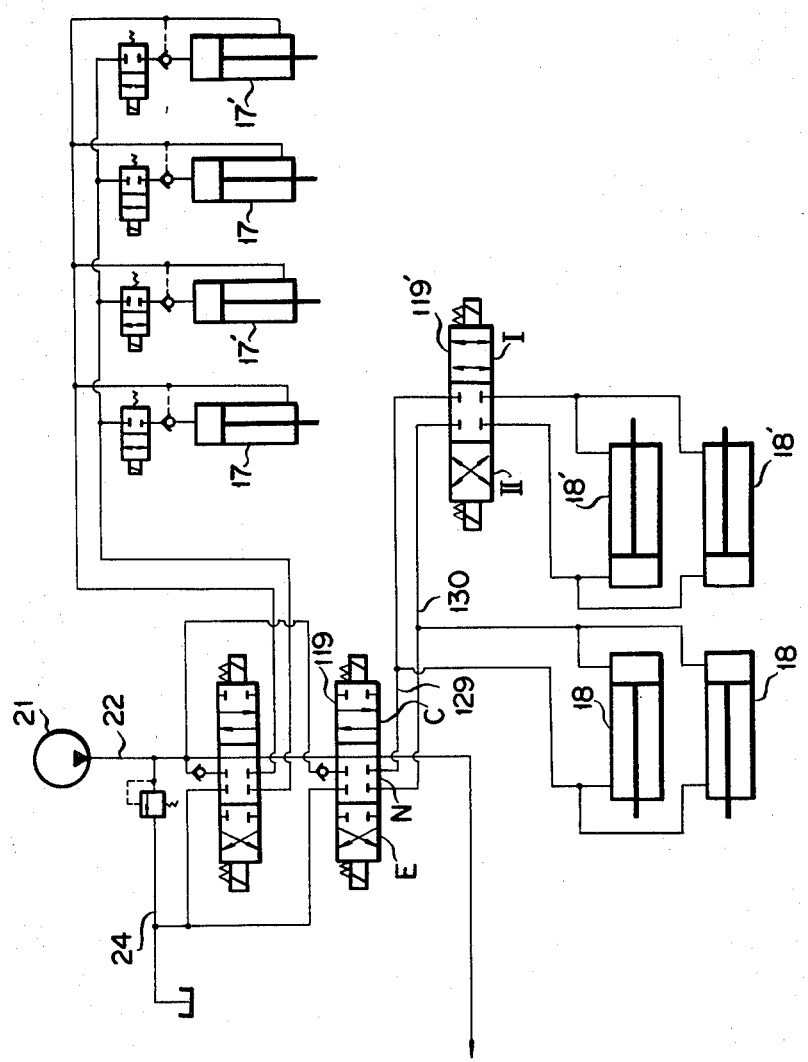
FIG. 3 is a schematic diagram of another example of hydraulic circuit providing for the lateral translation of the vehicle of FIG. 1.

FIG. 3 shows another example of hydraulic circuit providing for the sideways movement of the outriggered vehicle 10 given in FIG. 1. This circuit differs from that of FIG. 2 only in the arrangement of two extend control valves 119 and 119'. The first extend control valve 119 is connected between the pump 21 and the first pair of extend cylinders 18, as is the first extend control valve 19 of the preceding embodiment, but the second extend control valve 119' is connected between the first valve 119 and the second pair of extend cylinders 18'.

Both first 119 and second 119' extend control valves are of the three-position closed-center type. The two offset positions of the first extend control valve 119 are as follows:

1. A CONTRACT position C for communicating the pump line 22 with a conduit 129 leading to the rod end chambers of the first pair of extend cylinders 18 and for communicating a conduit 130, leading to the head end chambers of the first pair of extend cylinders, with the drain conduit 24.

2. An EXTEND position E for communicating the pump line 22 with the conduit 130 and for communicating the conduit 129 with the drain conduit 24.

In addition to its closed center position the second extend control valve 119' has:

1. A first offset position I for communicating the conduits 129 and 130 with the rod end chambers and head end chambers, respectively, of the second pair of extend cylinders 18'.

2. A second offset position II for communicating the conduits 129 and 130 with the head end chambers and rod end chambers, respectively, of the second pair of extend cylinders 18'.

The other details of configuration of this modified hydraulic circuit are identical with those of the circuit of FIG. 2. As may have been seen from the foregoing, the modified circuit offers the advantage that, if the second extend control valve 119' is set in its first offset position I, only the first extend control valve 119 needs to be activated for the simultaneous extension or contraction of all the outrigger beams 13 and 13'. In the preceding embodiment, on the other hand, both extend control valves 19 and 19' must be activated for the extension and contraction of all the outrigger beams. The following table gives the working positions of the two extend control valves 119 and 119' in various combinations and the resultant functions of the extend cylinders 18 and 18'.

| First Extend Control Valve 119 | Second Extend Control Valve 119 | Function |
| --- | --- | --- |
| C | I | Contraction of all outrigger beams |
| C | II | Leftward translation of vehicle body |
| E | I | Extension of all outrigger beams |
| E | II | Rightward translation of vehicle body |

In order to effect leftward translation of the outriggered vehicle 10, as in FIG. 1, with the hydraulic circuit of FIG. 3, the first extend control valve 119 may be shifted to the EXTEND position E, with the second extend control valve 119' held in neutral. The valve 119 will then direct the pressurized fluid from the pump 21 to the head end chambers of the first pair of extend cylinders 18 thereby causing leftward extension of the first pair of outrigger beams 13. The second pair of outrigger beams 13' are now assumed to be contracted.

Then all the lift cylinders 17 and 17' are extended as in the preceding embodiment to raise the wheeled vehicle body 11 off the ground. While the vehicle body is thus lifted, the first extend control valve 119 is shifted to the CONTRACT position C, and the second extend control valve 119' to the second offset position II. Thereupon, as is apparent from the above table, the vehicle body undergoes leftward translation, since then the first pair of extend cylinders 18 are contracted, and the second pair 18' extended. Then all the lift cylinders 17 and 17' are contracted to lower the vehicle body onto the ground. This cycle of operation is to be repeated as required. The vehicle can of course be crabbed to the right through a like procedure.

Modification

Figure 4:
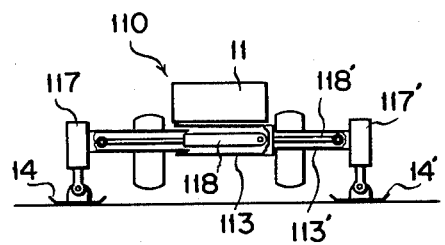
FIG. 4 is a view similar to FIG. 1 but showing another example of outriggered vehicle to which the invention is applicable.

FIG. 4 illustrates another example of outriggered vehicle 110 to which the present invention is applicable. The vehicle 110 differs from the vehicle 10 of FIG. 1 in having an outrigger system of generally H-shaped configuration as seen in an end view as in this figure. The outrigger system includes two pairs of longitudinally spaced, telescopic beams 113 and 113' rigidly connected to the wheeled vehicle body 11 so as to extend horizontally. Each outrigger beam has a lift cylinder 117, 117' depending from its extensible end and terminating in the float 14, 14'. Each outrigger beam also has an extend cylinder 118, 118' mounted therein.

As in the vehicle 10 of FIG. 1, the lift cylinders 117 and 117' serve to raise and lower the vehicle body 11 in coaction with the outrigger beams 113 and 113', and the extend cylinders 118 and 118' function to extend and contract the outrigger beams. Obviously, therefore, the hydraulic circuit of FIG. 2 or of FIG. 3 finds application to this outriggered vehicle 110, to make it possible for the vehicle to move crabwise. The vehicle has the advantage of effecting such crabwise motion without being much affected by ground undulations.

Although the invention has been disclosed in terms of preferable embodiments as adapted for specific types of vehicles, it is to be understood that various changes and modifications may be made without departing from the spirit of the invention as defined by the following claims.

What is claimed is:

1. A vehicle capable of crabwise translation, comprising:
    a body having ground engaging means for longitudinal translation;
    first and second pairs of extensible outrigger beams connected to the body, each outrigger beam extending generally transversely of the vehicle, each outrigger beam of each pair being spaced longitudinally of the vehicle;
    a set of lift cylinders co-acting with the pairs of outrigger beams for moving the body and the ground engaging means up and down with respect to the ground;
    first and second pairs of extend cylinders mounted to the first and second pairs of outrigger beams, respectively, for independently extending and contracting the same;
    a fluid circuit for independently actuating the set of lift cylinders, the first pair of extend cylinders, and the second pair of extend cylinders which comprises:
    a source of fluid under pressure,
    lift control valve means connected between the pressurized fluid source and the lift cylinders for controlling communication therebetween,
    a first extend control valve between the pressurized fluid source and the first pair of extend cylinders for controlling communication therebetween, and
    a second extend control valve between the pressurized fluid source and the second pair of extend cylinders for controlling communication therebetween;
    whereby the vehicle can be shifted crabwise by selective actuation of the set of lift cylinders and the first and second pairs of extend cylinders.

2. A hydraulic circuit providing for crabwise translation of a vehicle of the type having two pairs of extensible outrigger beams connected to a vehicle body and each extending generally transversely thereof, a set of lift cylinders coacting with the pairs of outrigger beams of moving the vehicle body up and down with respect to the ground, and two pairs of extend cylinders associated with the respective pairs of outrigger beams for extending and contracting the same, the hydraulic circuit comprising:
    a pump;
    lift control means connected between the pump and the lift cylinders for causing the selective extension and contraction of the latter and hence up-and-down motion of the vehicle body; and
    extend control valve means connected between the pump and the extend cylinders for independently causing the selective extension and contraction of the individual pairs of extend cylinders and hence of the corresponding pairs of outrigger beams comprising:
    a first extend control valve connected between the pump and one pair of extend cylinders for controlling communication therebetween, and
    a second extend control valve connected between the pump and the other pair of extend cylinders for controlling communication therebetween;
    whereby the vehicle can be shifted crabwise by selective actuation of the lift control valve means and the extend control valve means.

3. A vehicle capable of crabwise translation, comprising:
    a body having ground engaging means for longitudinal translation;
    first and second pairs of extensible outrigger beams connected to the body,
    each outrigger beam extending generally transversely of the vehicle, each pair of outrigger beams being spaced longitudinally of the vehicle;
    a set of lift cylinders co-acting with the pairs of outrigger beams for moving the body and the ground engaging means up and down with respect to the ground;
    first and second pairs of extend cylinders mounted to the first and second pairs of outrigger beams, respectively, for independently extending and contracting the same;
    a fluid circuit for independently actuating the set of lift cylinders, the first pair of extend cylinders, and the second pair of extend cylinders which comprises:
    a source of fluid underpressure,
    lift control valve means connected between the pressurized fluid source and the lift cylinders for controlling communication therebetween,
    a first extend control valve connected between the pressurized fluid source and the first pair of extend cylinders for controlling communication therebetween, and
    a second extend control valve connected between the first extend control valve and the second pair of extend cylinders for controlling communication therebetween;
    whereby the vehicle can be shifted crabwise by selective actuation of the set of lift cylinders and the first and second pairs of extend cylinders.

4. A hydraulic circuit providing for crabwise translation of a vehicle of the type having two pairs of extensible outrigger beams connected to a vehicle body and each extending generally transversely thereof, a set of lift cylinders co-acting with the pairs of outrigger beams for moving the vehicle body up and down with respect to the ground, and two pairs of extend cylinders associated with the respective pairs of outrigger beams for extending and contracting the same, the hydraulic circuit comprising:
    a pump;
    lift control valve means connected between the pump and the lift cylinders for causing the selective extension and contraction of the latter and hence the up and down motion of the vehicle body; and
    extend control valve means connected between the pump and the extend cylinders for independently causing the selective extension and contraction of the individual pairs of extend cylinders and hence of the corresponding pairs of outrigger beams comprising:

a first extend control valve connected between the pump and one pair of extend cylinders for controlling communication therebetween, and a second extend control valve connected between the first extend control valve and the other pair of extend cylinders for controlling communication therebetween;

whereby the vehicle can be shifted crabwise by selective actuation of the lift control valve means and the extend control valve means.

* * * * *